(12) United States Patent
Dhakras et al.

(10) Patent No.: US 8,397,039 B2
(45) Date of Patent: Mar. 12, 2013

(54) STORAGE SYSTEMS AND METHODS

(75) Inventors: Nilesh Dhakras, Pune (IN); Aditya Gokhale, Maharashtra (IN)

(73) Assignee: SYMANTEC CORPORATION, Mountain View, CA (US)

( * ) Notice: Subject to any disclaimer, the term of this patent is extended or adjusted under 35 U.S.C. 154(b) by 165 days.

(21) Appl. No.: 12/705,448

(22) Filed: Feb. 12, 2010

(65) Prior Publication Data

US 2011/0202734 A1 Aug. 18, 2011

(51) Int. Cl.
*G06F 12/00* (2006.01)
*G06F 12/16* (2006.01)

(52) U.S. Cl. ......... 711/162; 711/E12.001; 711/E12.103; 718/1

(58) Field of Classification Search ................ 711/162, 711/E12.001, E12.103; 718/1
See application file for complete search history.

(56) References Cited

U.S. PATENT DOCUMENTS

2010/0011178 A1* 1/2010 Feathergill .................. 711/162

OTHER PUBLICATIONS

Symantec Corporation, "Veritas™ Volume Replicator Administrator's Guide", Solaris, 5.0 Maintenance Pack 3, 2008.
Symantec Corporation, "Veritas™ Volume Manager Administrators Guide", Solaris, 5.0 Maintenance Pack 3, 2008.
p2vbackup, Physical virtual.backup, http://www.p2vbackup.com/p2vbtutorial.asp, 8 pages, 2007.
Unique Disaster Recovery Technology: Enable Recovery within Minutes, http://www.inmage.com/technology/technology-details.html, 6 Pages.

* cited by examiner

*Primary Examiner* — Yong Choe
(74) *Attorney, Agent, or Firm* — Wilmer Cutler Pickering Hale and Dorr LLP

(57) ABSTRACT

Systems and methods for backup test restore are presented. In one embodiment a backup restore test method includes performing a backup process; performing a test restore virtual environment creation process, the test restore virtual environment including a plurality of virtual machines; and performing a test of the backup on the test restore virtual environment. The backup process can include backing up information associated with an application; identifying prerequisites associated with running the application; and backing up information associated with the prerequisites. The test restore virtual environment creation process can include gathering information identifying the prerequisites associated with the application; creating the plurality of virtual machines, wherein the plurality of virtual machines includes virtual machines corresponding to physical machines the application and perquisites run on; and bringing up the plurality of virtual machines utilizing the information from the backup process.

17 Claims, 12 Drawing Sheets

100

101

Performing a backup process.

102

Performing a test restore virtual environment creation process, the test restore virtual environment including a plurality of virtual machines.

103

Performing a test of the backup on the test restore virtual environment.

Backing up information associated with an application.

202

Identifying prerequisites associated with running the application.

203

Backing up information associated with the prerequisites.

Gathering information identifying the prerequisites associated with the application.

302

Creating the plurality of virtual machines, wherein the plurality of virtual machines includes virtual machines corresponding to physical machines the application and perquisites run on.

303

Bringing up the plurality of virtual machines utilizing the information from the backup process.

FIGURE 3

801
Backup restore test module

810

Backup process module.

820

A test restore virtual environment creation module.

830

A test control module.

FIGURE 8

910 Backup Process Module

911
Application backup module

912
Prerequisite identification module

913
Prerequisite backup module

FIGURE 9A

920 A test restore virtual environment creation module

921
Prerequisites identification gathering module

922
Virtual machine creation module

923
Virtual machine initialization module

FIGURE 9B

STORAGE SYSTEMS AND METHODS

FIELD OF THE INVENTION

The present embodiments relate to the field of information storage replication.

BACKGROUND OF THE INVENTION

Electronic systems and circuits are often utilized in a number of applications to achieve advantageous results. Numerous electronic technologies such as computers, video equipment, and communication systems facilitate increased productivity and cost reduction in analyzing and communicating information in most areas of business, science, education and entertainment. Frequently, these activities involve storage of vast amounts of information and significant resources are expended storing and processing the information. Maintaining accurate replicated backup storage of the information is often very important for a variety or reasons (e.g., disaster recovery, corruption correction, etc.).

Regularly checking or monitoring that the backups are actually restorable and accurate is important to proper maintenance. Conventional backup testing may attempt to determine if a write operation or transaction is completed but do not usually check the accuracy or integrity of the backup data. Any further conventional backup restore testing attempts are usually very limited (e.g., limited to a single machine analysis, not able to test application setup, etc.) or require a complete duplicate physical configuration that usually consume a vast amount of resources (e.g., multiple physical machines and physical network connections). These duplicate complex physical system approaches are typically expensive and inconvenient. Further complicating the issue are problems that arise that are relatively unique to particular system configurations.

One of the most difficult tasks in finding a solution is attempting to gather sufficient and relevant information. Some applications have prerequisites that should be addressed prior to completing testing in order to obtain reliable restore test results. For example, some applications have prerequisites that should be up and running and available (e.g., other applications, multiple devices, interconnections, unique test parameters, etc). Conventional approaches typically do not address testing associated with multiple applications or devices unless the multiple applications and devices are physically available and manually configured, which can be very labor intensive and susceptible to inconsistent human errors. The cost and expenditure of physically duplicating the requisite systems and networks often prevents the performance of backup restore testing as a practical matter, resulting in more instance of backup restore failures when the backup information is needed by the primary operating system.

SUMMARY

Systems and methods for backup test restore are presented. In one embodiment a backup restore test method includes performing a backup process; performing a test restore virtual environment creation process, the test restore virtual environment including a plurality of virtual machines; and performing a test of the backup in the test restore virtual environment. The backup process can include backing up information associated with an application; identifying prerequisites associated with running the application; and backing up information associated with the prerequisites. The test restore virtual environment creation process can include gathering information identifying the prerequisites associated with the application; creating the plurality of virtual machines, wherein the plurality of virtual machines includes virtual machines corresponding to physical machines the application and perquisites run on; and bringing up the plurality of virtual machines utilizing the information from the backup process. Bringing up the plurality of virtual machines can include coordinating boot-up of the virtual machines. In one embodiment, the backup process includes collecting application specific configuration information. The application specific configuration information can be used to link the backups of different machines associated with the prerequisites. In one exemplary implementation, the test restore virtual environment creation process includes identifying machines associated with running application specific tests.

In one embodiment a computer readable storage medium has stored thereon, computer-executable instructions that when executed by a computing device cause the computing device to perform a backup restore test method. In one embodiment a system is utilized to perform a backup test restore method. The system can include a computer system having a processor coupled to a computer readable storage media and executing computer readable code which causes the computer system to perform a backup test restore method.

DESCRIPTION OF THE DRAWINGS

The accompanying drawings, which are incorporated in and form a part of this specification, are included for exemplary illustration of the principles of the present embodiments and not intended to limit the present invention to the particular implementations illustrated therein. The drawings are not to scale unless otherwise specifically indicated.

FIG. 1 is a block diagram of an exemplary backup test restore method in accordance with one embodiment of the present invention.

FIG. 2 is a block diagram of an exemplary backup process in accordance with one embodiment of the invention.

FIG. 3 is a block diagram of an exemplary virtual test restore environment creation process in accordance with one embodiment of the invention.

FIG. 8 is a block diagram of an exemplary backup restore test module in accordance with one embodiment of the present invention.

FIG. 9A is a block diagram of an exemplary backup process module in accordance with one embodiment of the present invention.

FIG. 9B is a block diagram of an exemplary test restore virtual environment creation module in accordance with one embodiment of the present invention.

DETAILED DESCRIPTION

Figure 4:
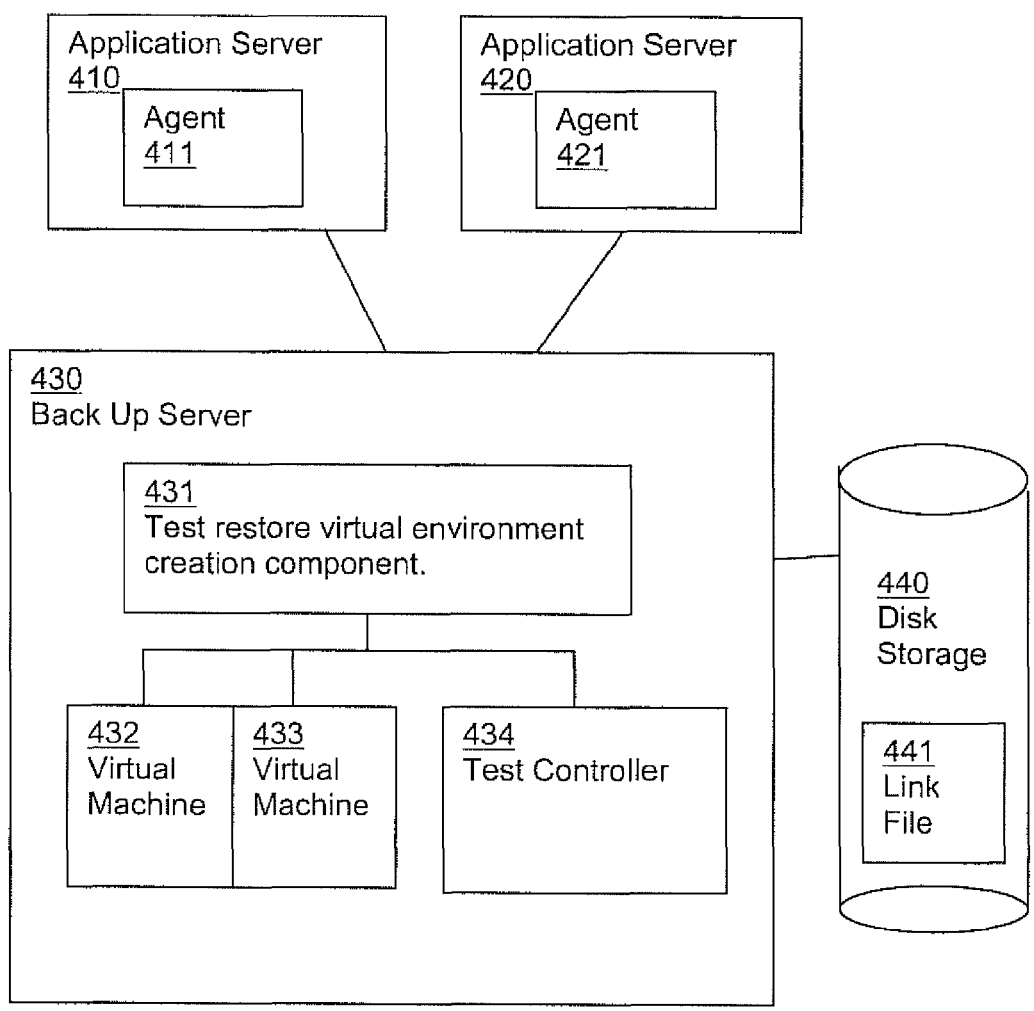
FIG. 4 is a block diagram of an exemplary test restore system in accordance with one embodiment of the invention.

Reference will now be made in detail to the preferred embodiments, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope as defined by the appended claims. Furthermore, in the following detailed description, numerous specific details are set forth in order to provide a thorough understanding. However, it will be obvious to one ordinarily skilled in the art that the present invention may be practiced without these specific details. In other instances, well known methods, procedures, components, and circuits have not been described in detail as not to unnecessarily obscure aspects of the current invention.

The present systems and methods facilitate efficient and effective memory backup restore testing operations. Present storage systems and methods minimize resource occupation and time expenditure confirming integrity and accuracy of backup and restore operations. The present systems and methods facilitate automated creation of virtual machines for performing restore testing while reducing the number of duplicate physical machines and physical network connections. In addition, the testing can be performed utilizing a virtual private test network to reduce potential interference with ongoing production system operations. The test restore can automatically incorporate backups of information from multiple physical machines, including a plurality of machines upon which prerequisites for an application depend.

FIG. 1 is a block diagram of backup test restore method 100 in accordance with one embodiment of the present invention. In one embodiment of backup test restore method 100 the backup restore testing is automated to collect normal backup information and additional application specific information during the backup phase. In one exemplary implementation, the additional application specific information is utilized during test restore to create a test setup of the application on virtual machines and run application specific tests to verity the consistency and accuracy of application information in the backup images. The test setup can include setting up communication between different entities of the application and creating a test environment where the tests can be run on the application.

In block 101, a backup process is performed. In one embodiment the backup process includes collecting application specific configuration information. In one exemplary implementation, the application specific configuration information includes identification of perquisites (e.g. various setup information, other applications, utilities, physical machines, physical connections, etc.) associated with running the application. The application specific configuration information can be retrieved from the application or other source. In one embodiment, the application specific configuration information can be retrieved from an agent included in the application. It is appreciated the present embodiments can include collecting application generic configuration information. The present embodiments can also include collecting runtime configuration information.

In one embodiment, application installation specific configuration information is collected and stored in a linking mechanism. In one exemplary implementation, the link mechanism includes information to link backups of different machines during a test restore process.

In block 102, a test restore virtual environment creation process is performed. In one embodiment, the test restore virtual environment includes a plurality of virtual machines. In one embodiment, the test restore virtual environment creation process utilizes information from the backup process performed in block 110 to create the test restore virtual environment. The test restore can be automatically scheduled and the test restore virtual environment is created according to the schedule. The test restore virtual environment creation process can also include creating virtual machine images of the backup image. The backup image created on the virtual machine is the one utilized during the test restore.

The creation of the test restore virtual environment can include the coordination and creation of the virtual communication links between the plurality of virtual machines in a virtual network. The plurality of virtual machines can be communicatively coupled in the virtual network (e.g., virtual private network, virtual local area network, etc.). In one exemplary implementation, the application specific configuration information is used to create virtual machines corresponding to the physical machines associated with the prerequisites. The application specific configuration information can also be used to create a linking mechanism that includes information linking the backups from the machines associated with the prerequisite. It is appreciated that the linking mechanisms are flexibly configuration in a variety of tracking or storage implementations including a link file, static memory, volatile memory, registry, cloud store, script/markup file, etc.

It is appreciated that present embodiments are flexibly scalable to a variety of implementations and considerations. In one embodiment, in addition to information gathered from the backup process (e.g., from block 110), the test restore virtual environment creation process can facilitate creation of virtual facilities to accommodate additional features. In one exemplary implementation, the test restore virtual environment creation process can receive information (e.g., information identifying machines, applications, prerequisites, etc.) associated with running application specific tests not identified in the application setup information. For example, information on resources associated with user specified tests (e.g., user supplied test instructions, scripts, policies, etc.). In one embodiment, the test restore virtual environment creation process includes the creation of additional virtual facilities (e.g., virtual devices, virtual links, etc.) that are not otherwise indicated in the retrieved backup information (e.g., from block 110) but needed to enable virtual implementation of the user specified tests.

In block 103, a test of the backup on the test restore virtual environment is performed. The test of the backup can begin when the test restore virtual environment creation is completed. It is appreciated that a test restore process can be utilized for testing a variety backup restore operations. In one embodiment, the test restore process can be utilized to facilitate backup data integrity testing. For example, testing if backup data is accurate or corrupted. In one exemplary implementation, test results are compared to a known correct result. In one embodiment, the test restore process can also forward test failure results for consideration in primary system testing. For example, information regarding backup restore test results that indicate corrupted data may be forwarded to the primary system for consideration of a disk check to check if the data on the primary system disks is corrupted.

In one embodiment, operations that test the integrity or sanity of the application backup information are run. The instructions for running the operations can be defined in a policy, test script, et cetera. The instructions can be included in the application specific information, the instructions can be customized instructions or scripts provided by a user, retrieved from a vendor, downloaded over a network, or can be from a variety of other sources. It is appreciated restore tests for multiple applications can be performed together. In one exemplary implementation, a job description can include multiple applications that are restore tested together.

Again, it is appreciated that present embodiments are flexibly adaptable to a variety of implementations and considerations. For example, an initial virtual backup test restore environment can be created and backup test restores can be scheduled to occur in accordance with various considerations (e.g., at regular intervals, when a work load threshold is exceeded, when a particular number of writes or amount of information is transacted in the primary performance system, policy driven, etc.). In one embodiment, an initial virtual backup test restore environment is created and updated in accordance with changed application specific system or prerequisite information for each scheduled test, rather than creating a whole new virtual backup test restore environment from scratch for each scheduled test restore. There can be a partial restore or a full restore of an application. In one exemplary implementation, rather than performing a full restore test of all backed up data, a statistical sampling of portions of information from a full restore are tested and a partial restore is performed directed to the tested information. For example, when testing an e-mail application of a company a test directed to ensuring the CEO's e-mail is backed up and restored successfully and a statistically sampling of a portion of other employees e-mail (e.g., percent all employee e-mails, a specific number of e-mails, e-mails associated with a specific number of employees, combinations of e-mail percentages/numbers and employee percentages/numbers).

FIG. 2 is a block diagram a backup process 200 in accordance with one embodiment of the invention. In one embodiment, backup process 200 is similar to the backup process performed in block 101.

In block 201, information associated with an application is backed up. For example, information associated with a primary performance system are backed up or stored to a secondary backup storage system. The secondary backup storage system retrieves information from the primary system and stores a replicated version as a backup. The replicated version can include an image of the information from the primary operation system. It is appreciated that present embodiments can be utilized to perform replication operations (e.g., backup, restore, test of backup restore, etc.) for a variety of applications. For example, the backup process can be directed to an e-mail application, a share point application, etc. In the example of an e-mail application the information included in or associated with the actual e-mails is backed up as well as additional information, including additional information set forth in the following description. The backup of the information associated with an application (e.g., the application information itself, information associated with prerequisites, other applications, machines, etc.) can be timed to occur at a coordinated restore point. For example, having a backup version of an exchange application and an active directory taken at the same time or check point to facilitate accurate backup and restore test results.

In block 202, prerequisites associated with running the application are identified. In one embodiment, the prerequisites are included in an agent of the application. It is appreciated the identification of the prerequisites can also be maintained in a variety of ways (e.g., separate from the application, in database, etc.). The perquisites or application specific configuration information can include various setup information, other applications, utilities, physical machines, physical connections, et cetera. For example, for the backup of an e-mail application prerequisites including a domain, active directory and e-mail database can be indentified.

In block 203, information associated with the prerequisites or application specific configuration information is backed up. For example, the backup process can also include backing up information associated with additional applications and machines identified in the application specific configuration information. In one exemplary implementation, the backup process is directed to an e-mail application and the information for the perquisites. For example, for the backup of an e-mail application prerequisites, including (e.g., a domain, active directory, e-mail database etc.), are also backed up.

FIG. 3 is a block diagram of virtual test restore environment creation process 300 in accordance with one embodiment of the invention. In one embodiment, the virtual test restore environment creation process 300 is similar to the virtual test restore environment creation process performed in block 102.

In block 301, information identifying the prerequisites associated with the application is gathered. In one embodiment, the information is retrieved from an agent in the application. It is appreciated the information can also be retrieved from a variety of sources (e.g., separate from the application, in a database, etc.). In one exemplary implementation, prerequisite information associated with an e-mail application (e.g., a domain, active directory, e-mail database, etc.) is retrieved. In one embodiment, the information identifying the prerequisites associated with the application is stored in a linking mechanism. In one embodiment, gathering information identifying the prerequisites associated with the application includes an automated query process. It is appreciated a variety of query and response mechanisms can be utilized (e.g. a function call query, a database query, an XML file transaction between an application agent and a backup server, etc.).

In block 302, the virtual machines are created. In one embodiment, the virtual machines include virtual machines corresponding to physical machines the application and perquisites run on. A physical to virtual conversion process can be utilized to create the virtual machines. The virtual machines can be included in a virtual network with virtual communication links. The virtual machines can be brought up with a predefined set of internet protocol (IP) addresses. In one exemplary implementation, several IP addresses can be utilized to perform virtual restore testing of a share point application. For example, various server (e.g., an image server, an SQL server, a file server, etc.) can be associated with the share point application and each one can be brought up in the restore test virtual network with a respective IP address. It is also appreciated that ID settings associated with the virtual machines can be manipulated or changed.

In block 303, the virtual machines are brought up and started utilizing the information from the backup process. In one embodiment, bringing up the plurality of virtual machines includes coordinating start up or boot-up of the virtual machines. For example, one or more of the virtual machines can be started or booted up before others of the virtual machines. In one exemplary implementation, the prerequisite or application specific configuration information (e.g., information included in the linking mechanism, etc.) includes information associated with coordinating the availability of virtual machine services and services on them. In one exemplary implementation, the coordination information includes information associated with virtual machine boot-up (e.g., orchestrating boot-up, and availability of services there on, etc.). Not only are the virtual machines brought up, the sequence of availability (boot-up) and services on those virtual machines after or during boot-up are also coordinated. In one exemplary implementation, an exchange application needs a domain controller to boot and have an active directory services restored and running before the boot or start of exchange services. The exchange server also needs to boot and register as part of domain, before the exchange service is started. In one embodiment, from a test restore point of view orchestration of boot-up and availability of services includes several operations. For example, virtual resources corresponding to the domain controller (e.g., named "DC1", etc.) and a normal server (e.g., named "EXSVR1", etc.) are booted up. The EXSVR1 is registered on DC1 domain and then the exchange application is restored in the virtual test restore environment with "DC1" name as domain name for exchange. Then EXSVR1 is rebooted.

FIG. 4 is a block diagram of test restore system 400 in accordance with one embodiment of the invention. Test restore system 400 includes application servers 410 and 420, backup server 430 and backup storage 440. The components of test restore system 400 cooperatively operate to facilitate backup and restore of application information and restore testing of the backed up information. Application servers 410 and 420 run application operations. Application servers 410 and 420 also forward backup and configuration information to backup server 430. Backup server 430 directs backup of application information. Backup server 430 also facilitates test restore operations utilizing a plurality of virtual machines associated with test restore operations directed at the backup corresponding to an application. Backup storage 440 stores information associated with a backup including information on links to prerequisite information. In one embodiment, backup storage includes a link file 441. It is appreciated that any of a variety of linking mechanisms can be utilized.

In one embodiment, application server 410 includes agent 411 and Application server 420 includes agent 421. Agents 411 and 421 include information regarding applications running on application servers 420 and 421 respectively. In one embodiment, the agents include information regarding the configuration of an application running on the respective application server. The configuration information can include application prerequisites (e.g., other applications, servers, devices, etc.). It is appreciated the application servers can have a variety of configurations. In one exemplary implementation, one application is running on each application server. In another exemplary implementation, one or more applications are running on each application server.

In one embodiment, backup server 430 includes test restore virtual environment creation component 431, virtual machines 432 and 433, and test controller 434. Test restore virtual environment creation component 431 creates a test restore virtual environment for testing integrity of a backup. In one embodiment, the test restore virtual environment creation component 431 directs creation of a plurality of virtual machines corresponding to physical machines associated with an application and the corresponding perquisites. Virtual machines 432 and 433 are virtual machines created by test restore virtual environment creation component 431. Virtual machines 432 and 433 are created based upon application backup information and are utilized to run the application backup information in the virtual environment. Test controller 434 directs restore testing of application backups running on virtual machines 432 and 433.

Figure 5:
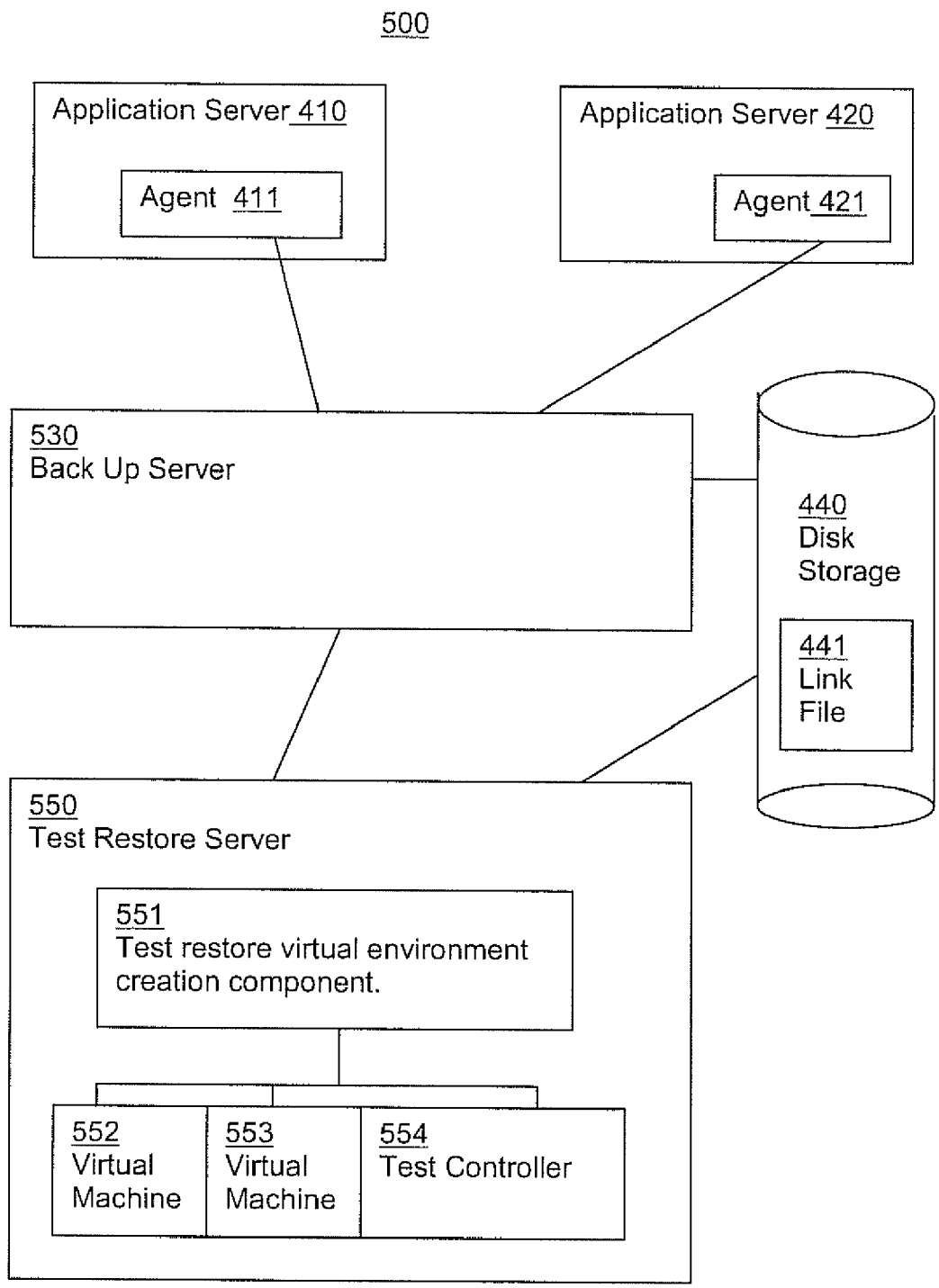
FIG. 5 is a block diagram of another exemplary test restore system in accordance with one embodiment of the invention.

FIG. 5 is a block diagram of test restore system 500 in accordance with one embodiment of the invention. Test restore system 500 is similar to test restore system 400 except test restore system 500 creates the virtual test restore environment on a separate test restore server. Test restore system 500 includes application servers 410 and 420, backup server 530, test restore server 550 and backup storage 440. Backup server 530 directs backup of application information and also forwards information to test restore server 550. Test restore server 550 performs test restore operations utilizing a plurality of virtual machines associated with test restore operations directed at the backup corresponding to an application.

Test restore virtual environment creation component 551 creates a test restore virtual environment for testing integrity of a backup. In one embodiment, the test restore virtual environment creation component 551 directs creation of a plurality of virtual machines corresponding to physical machines associated with an application and corresponding perquisites. Virtual machines 552 and 553 are virtual machines created by test restore virtual environment creation component 551. Virtual machines 552 and 553 are created based upon application backup information and are utilized to run the application backup information in the virtual environment. Test controller 554 directs restore testing of application backups running on virtual machines 552 and 553.

Figure 6:
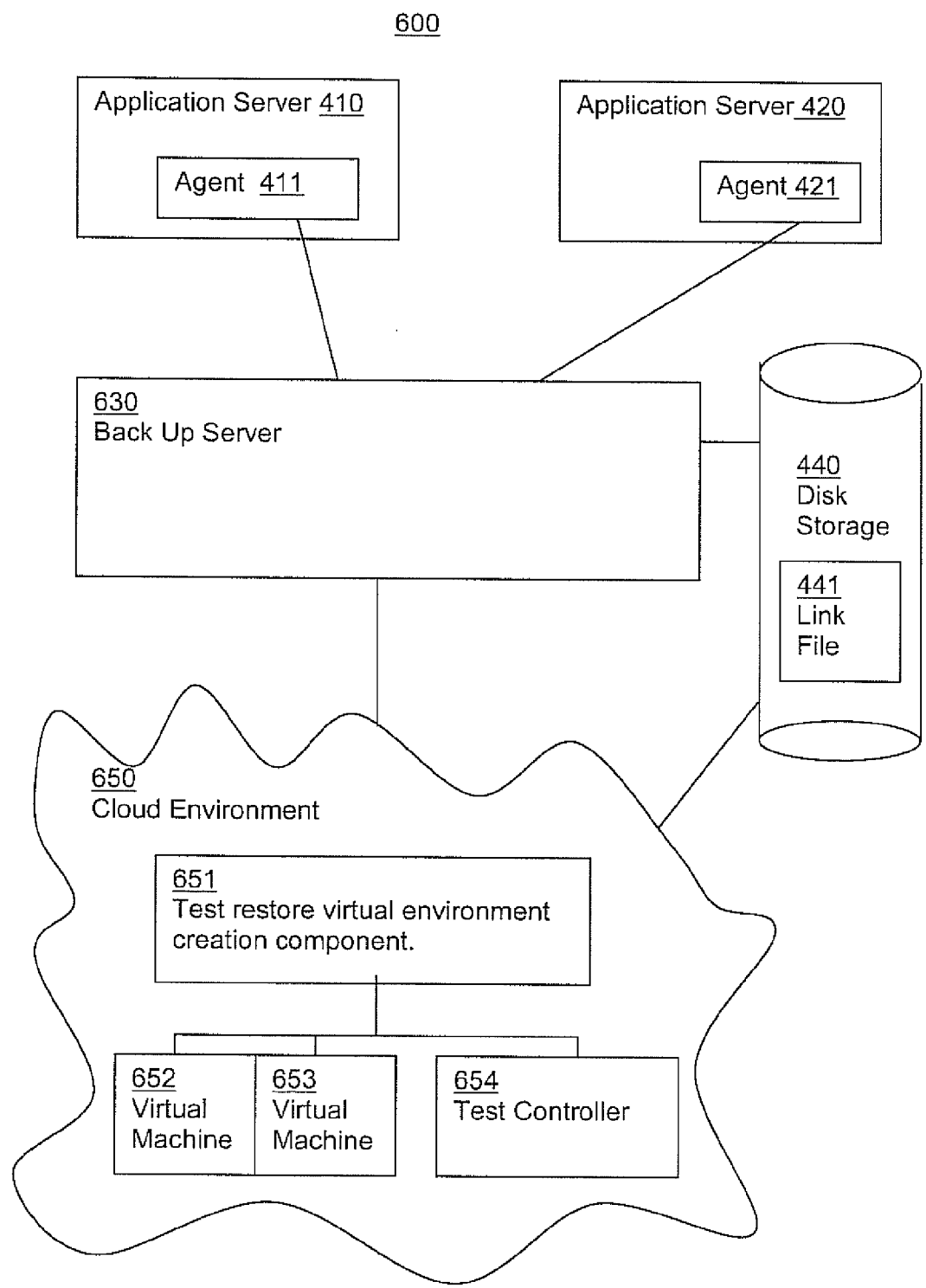
FIG. 6 is a block diagram of an additional exemplary test restore system in accordance with one embodiment of the invention.

FIG. 6 is a block diagram of test restore system 600 in accordance with one embodiment of the invention. Test restore system 600 is similar to test restore system 400 except test restore system 600 creates the virtual test restore environment on a cloud environment. In one embodiment the cloud environment includes a storage area network. Test restore system 600 includes application servers 410 and 420, backup server 630, test restore cloud environment 650 and backup storage 440. Backup server 630 directs backup of application information and also forwards information to test restore cloud environment 650. Test restore cloud environment 650 performs test restore operations utilizing a plurality of virtual machines associated with test restore operations directed at the backup corresponding to an application.

Test restore virtual environment creation component 651 creates a test restore virtual environment for testing integrity of a backup. In one embodiment, the test restore virtual environment creation component 651 directs creation of a plurality of virtual machines corresponding to physical machines associated with an application and the corresponding perquisites. Virtual machines 652 and 653 are virtual machines created by test restore virtual environment creation component 651. Virtual machines 652 and 653 are created based upon application backup information and are utilized to run the application backup information in the virtual environment. Test controller 654 directs restore testing of application backups running on virtual machines 652 and 653.

Figure 7:
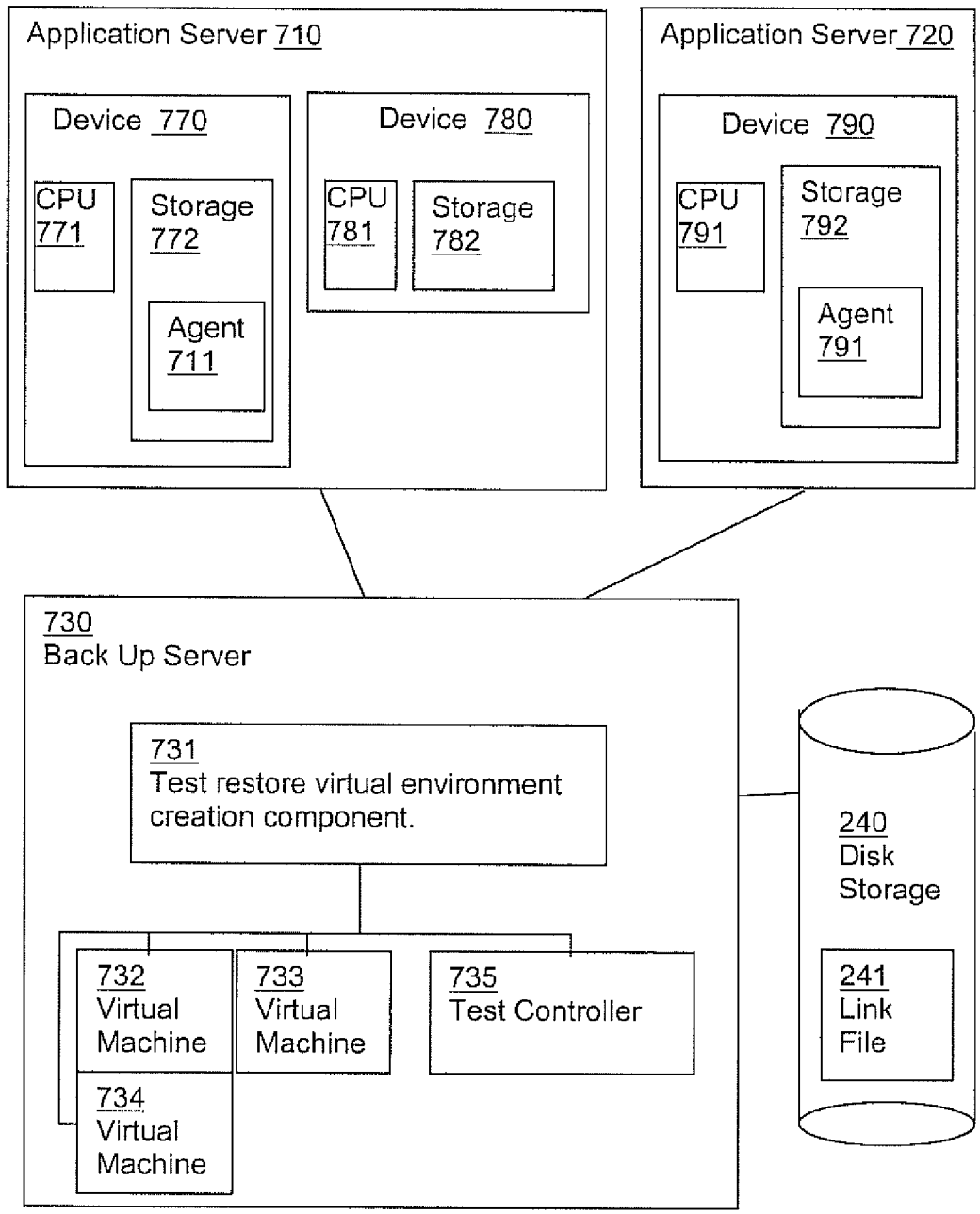
FIG. 7 is a block diagram of another exemplary test restore system configuration in accordance with one embodiment of the invention.

FIG. 7 is a block diagram of test restore system 700 in accordance with one embodiment of the invention. Test restore system 700 is one embodiment of test restore system 400 including an application running on multiple devices. Test restore system 700 includes application servers 710 and 720, backup server 730, test restore server 750 and backup storage 740.

Application server 710 is running on device 770 and device 780. Device 770 includes central processing unit (CPU) 771 and storage 772. Device 780 includes central processing unit (CPU) 781 and storage 782. In one embodiment, storage 772 includes agent 773 which stores application configuration information. It is appreciated that configuration information can also be stored (not shown) on storage 782. Application server 720 is running on device 790 which includes central processing unit (CPU) 791 and storage 792. In one embodiment, storage 792 includes agent 793 which stores application configuration information.

Backup server 730 directs backup of application information. Backup server 730 also facilitates test restore operations utilizing a plurality of virtual machines associated with test restore operations directed at the backup corresponding to an application. Test restore virtual environment creation component 731 creates a test restore virtual environment for testing integrity of a backup. In one embodiment, the test restore virtual environment creation component 731 directs creation of a plurality of virtual machines corresponding to physical machines (e.g., devices 770, 780 and 790) associated with an application and the application corresponding perquisites. Virtual machines 732, 733 and 734 are virtual machines created by test restore virtual environment creation component 731. Virtual machines 732, 733 and 734 are created based upon application backup information and are utilized to run the application backup information in the virtual environment. Test controller 755 directs restore testing of application backups running on virtual machines 732, 733 and 754.

In one embodiment, a computer readable medium includes modules for including instructions directed at performing a backup test restore. FIG. 8 is a block diagram of backup test restore module 801 which includes instructions for directing a processor in performance of a (e.g., backup test restore method 100, etc.). Backup restore test module 801 includes backup process module 810, test restore virtual environment creation module 820, and test control module 830. Backup restore test module 801 includes instructions for performing a backup process. In one embodiment, backup restore test module 801 includes instructions for performing block 101. Test restore virtual environment creation module 820 includes instructions for performing a test restore virtual environment creation process. In one embodiment, test restore virtual environment creation module 820 includes instructions for performing block 102. Test control module 830 includes instructions for performing a test of the backup on the test restore virtual environment. In one embodiment, test control module 830 includes instructions for performing block 103.

FIG. 9A is a block diagram of backup process module 910 in accordance with one embodiment of the present invention. Backup process module 910 includes application backup module 911, prerequisite identification module 912 and prerequisite backup module 913. Application backup module 921 includes instructions for backing up information associated with an application. In one embodiment, identification gathering module 921 includes instructions for performing block 210. Prerequisite identification module 912 includes instructions for identifying prerequisites associated with running the application. In one embodiment, prerequisite identification module 912 includes instructions for performing block 220. Prerequisite backup module 913 includes instructions for backing up information associated with the prerequisites or application specific configuration information. In one embodiment, Prerequisite backup module 913 includes instructions for performing block 230.

FIG. 9B is a block diagram of test restore virtual environment creation module 920 in accordance with one embodiment of the present invention. Test restore virtual environment creation module 920 includes prerequisites identification gathering module 921, virtual machine creation module 922 and virtual machine initialization module 923. Identification gathering module 921 includes instructions for gathering information identifying the prerequisites associated with the application. In one embodiment, identification gathering module 921 includes instructions for performing block 310. Virtual machine creation module 922 includes instructions for creating the plurality of virtual machines. In one embodiment, virtual machine creation module 922 includes instructions for performing block 320. Virtual machine initialization module 923 includes instructions for bringing up and starting the plurality of virtual machines utilizing the information from the backup process. In one embodiment, virtual machine initialization module 923 includes instructions for performing block 330.

Backup test restore method 100 can be implemented on a variety of devices as, for example, a server computer system, workstation computer system, desktop computer system, laptop computer system, handheld device, etc. Computer readable media for storing information associated with backup test restore method 100 can also be a number of different types of media that can be accessed by computer system and can include, but is not limited to, removable and non removable computer storage media, flash memory, hard disk, optical disk drive, compact disk (CD) etc.). It should further be noted, that the backup test restore method 100 can have some, most, or all of its functionality implemented by a distributed computer system having a large number of dispersed computing nodes, as would be the case where the functionality of the backup test restore method 100 is partly or wholly executed using a cloud computing environment.

Figure 10:
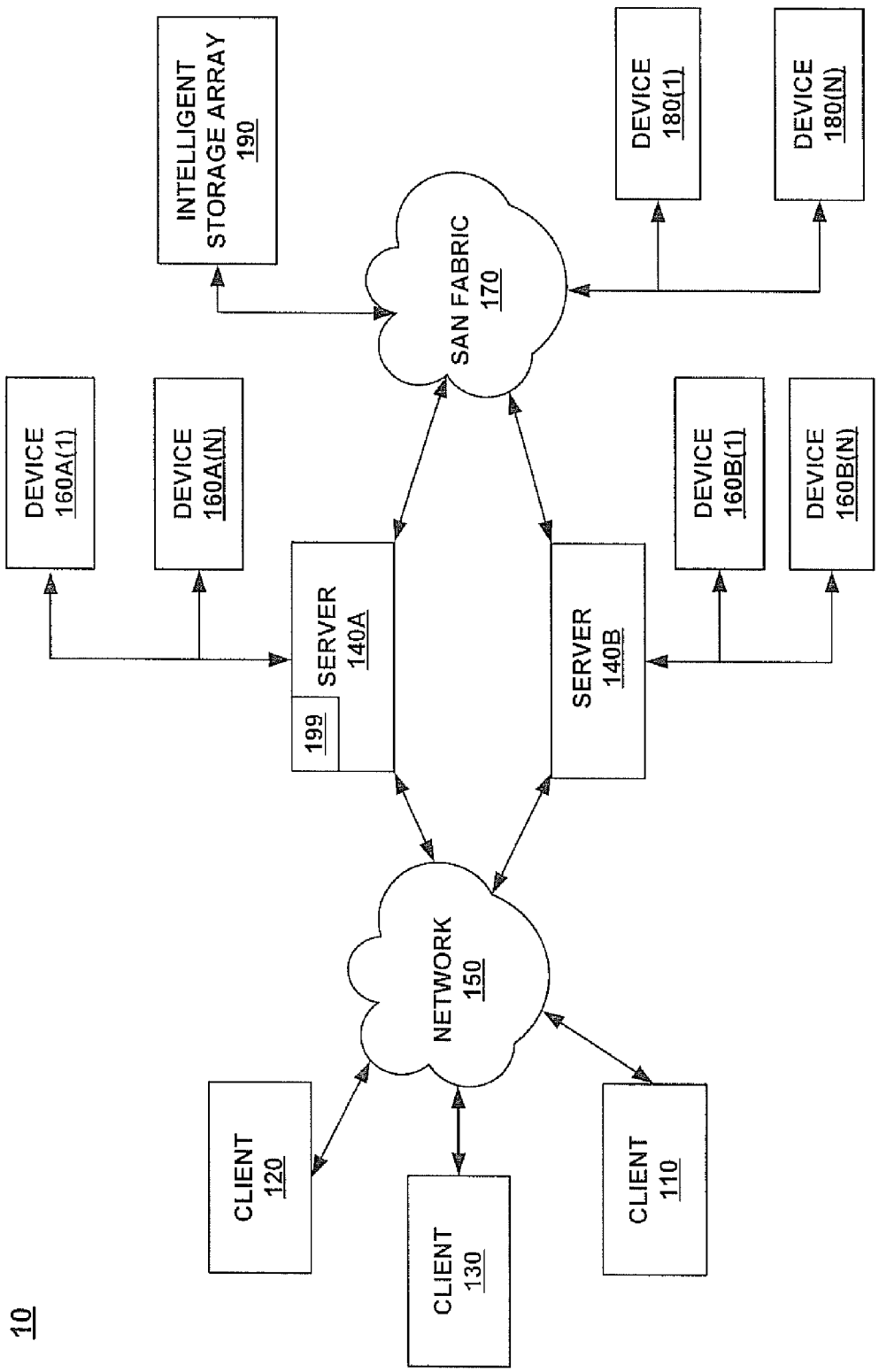
FIG. 10 is a block diagram depicting an exemplary network architecture in accordance with one embodiment of the present invention.

In one embodiment, backup test restore method 100 can be implemented on a network. FIG. 10 is a block diagram depicting a network architecture 1000 in which client systems 110, 120 and 130, as well as storage servers 140A and 140B (any of which can be implemented using computer system 210), are coupled to a network 150. Storage server 140A is further depicted as having storage devices 160A (1)-(N) directly attached, and storage server 140B is depicted with storage devices 160B (1)-(N) directly attached. Storage servers 140A and 140B are also connected to a SAN fabric 170, although connection to a storage area network is not required for operation of the disclosure. SAN fabric 170 supports access to storage devices 180(1)-(N) by storage servers 140A and 140B, and so by client systems 110, 120 and 130 via network 150. Intelligent storage array 190 is also shown as an example of a specific storage device accessible via SAN fabric 170. In one embodiment, server 140A includes storage backup test restore module 199. In one embodiment, backup test restore module 199 is similar to similar to backup test restore module 801. It is appreciated that present systems and methods are compatible with a variety of implementations. For example, portions of information and instructions associated with can be distributed in various resources.

Figure 11:
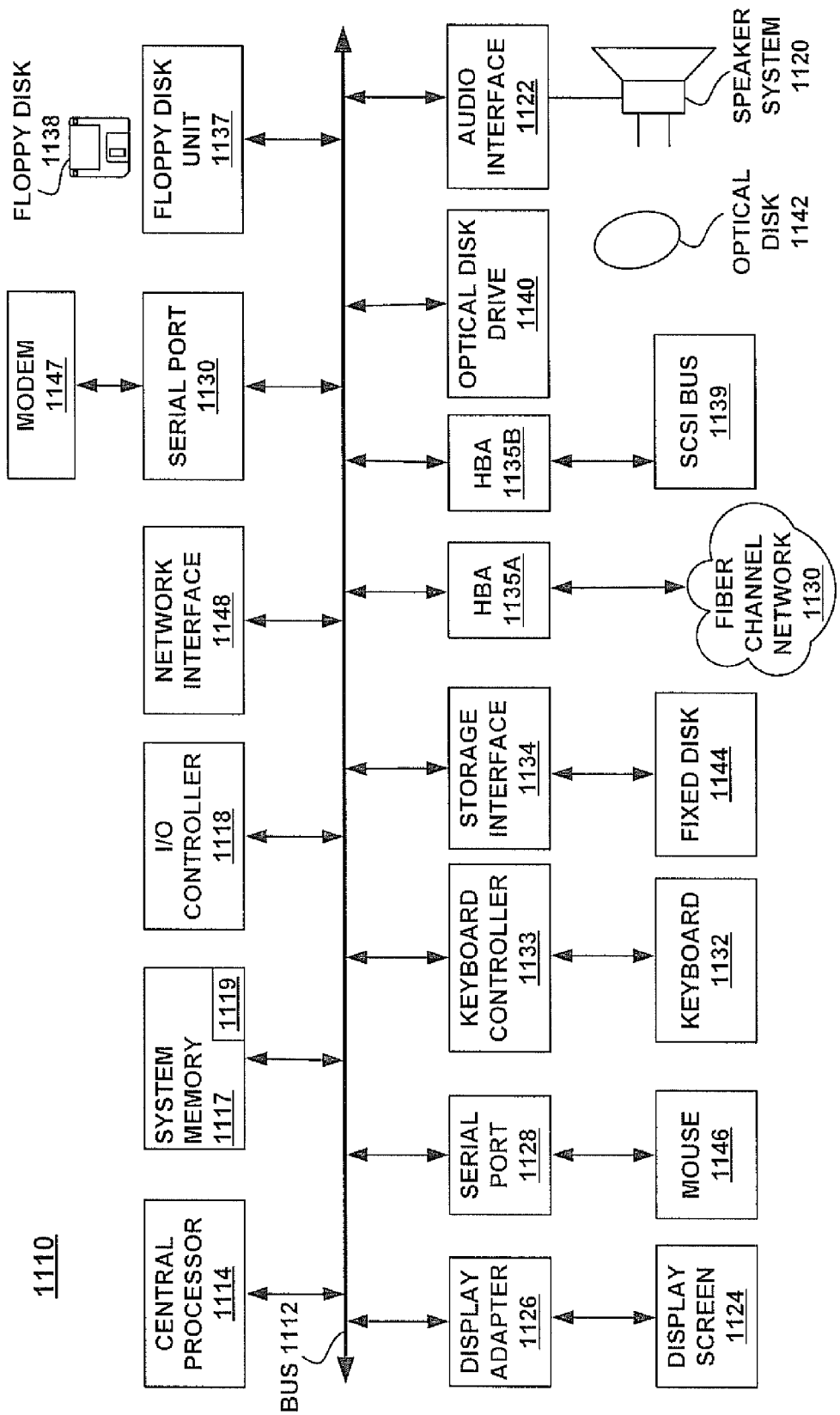
FIG. 11 depicts a block diagram of an exemplary computer system in accordance with one embodiment of the present invention.

FIG. 11 depicts a block diagram of a computer system 1110 suitable for implementing the present disclosure. Computer system 1110 includes a bus 1112 which interconnects major subsystems of computer system 1110, such as a central processor 1114, a system memory 1117 (typically RAM, but which may also include ROM, flash RAM, or the like), an input/output controller 1118, an external audio device, such as a speaker system 1120 via an audio output interface 1122, an external device, such as a display screen 1124 via display adapter 1126, serial ports 1128 and 1130, a keyboard 1132 (interfaced with a keyboard controller 1133), a storage interface 1134, a floppy disk drive 1137 operative to receive a floppy disk 1138, a host bus adapter (HBA) interface card 1135A operative to connect with a Fiber Channel network 1190, a host bus adapter (HBA) interface card 1135B operative to connect to a SCSI bus 1139, and an optical disk drive 1140 operative to receive an optical disk 242. Also included are a mouse 1146 (or other point-and-click device, coupled to bus 212 via serial port 1128), a modem 1147 (coupled to bus 1112 via serial port 1130), and a network interface 1148 (coupled directly to bus 1112).

Bus 1112 allows data communication between central processor 1114 and system memory 1117, which may include read-only memory (ROM) or flash memory (neither shown), and random access memory (RAM) (not shown), as previously noted. In one embodiment, instructions for performing a storage request flow control method (e.g., similar to storage flow control method 1100) are stored in one or more memories of computer system 1100 (e.g., in memory location 1119). The RAM is generally the main memory into which the operating system and application programs are loaded. In one embodiment, RAM 1117 includes backup test restore module 1199. In one embodiment, memory backup test restore module 1199 is similar to backup test restore module 801. The ROM or flash memory can contain, among other code, the Basic Input-Output system (BIOS) which controls basic hardware operation such as the interaction with peripheral components. Applications resident with computer system 1110 are generally stored on and accessed via a computer readable medium, such as a hard disk drive (e.g., fixed disk 1144), an optical drive (e.g., optical drive 1140), floppy disk unit 1137, or other storage medium. Additionally, applications can be in the form of electronic signals modulated in accordance with the application and data communication technology when accessed via network modem 1147 or interface 248.

Storage interface 1134, as with the other storage interfaces of computer system 1110, can connect to a standard computer readable medium for storage and/or retrieval of information, such as a fixed disk drive 1144. Fixed disk drive 1144 may be a part of computer system 1110 or may be separate and accessed through other interface systems. Modem 1147 may provide a direct connection to a remote server via a telephone link or to the Internet via an internet service provider (ISP). Network interface 1148 may provide a direct connection to a remote server via a direct network link to the Internet via a POP (point of presence). Network interface 1148 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 11 need not be present to practice the present disclosure. The devices and subsystems can be interconnected in different ways from that shown in FIG. 11. Code to implement the present disclosure can be stored in computer-readable storage media such as one or more of system memory 1117, fixed disk 1144, optical disk 1142, or floppy disk 1138. The operating system provided on computer system 1110 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present disclosure may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

With reference to computer system 210, modem 247, network interface 248 or some other method can be used to provide connectivity from each of client computer systems 110, 120 and 130 to network 150. Client systems 110, 120 and 130 are able to access information on storage server 140A or 140B using, for example, a web browser or other client software (not shown). Such a client allows client systems 110, 120 and 130 to access data hosted by storage server 140A or 140B or one of storage devices 160A(1)-(N), 160B(1)-(N), 180(1)-(N) or intelligent storage array 190. FIG. 6 depicts the use of a network such as the Internet for exchanging data, but the present disclosure is not limited to the Internet or any particular network-based environment.

Portions of the detailed description are presented and discussed in terms of a method. Although steps and sequencing thereof are disclosed in figures herein describing the operations of this method, such steps and sequencing are exemplary. Embodiments are well suited to performing various other steps or variations of the steps recited in the flowchart of the figure herein, and in a sequence other than that depicted and described herein. Some portions of the detailed description are presented in terms of procedures, steps, logic blocks, processing, and other symbolic representations of operations on data bits that can be performed within a computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps include physical manipulations of physical quantities. Usually, though not necessarily, these quantities take the form of electrical, magnetic, optical or quantum signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout, discussions utilizing terms such as "processing", "computing", "calculating", "determining", "displaying", "accessing," "writing," "including," "storing," "transmitting," "traversing," "associating," "identifying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Computing devices can include at least some form of computer readable media. Computer readable media can be any available media that can be accessed by a computing device.

By way of example, and not limitation, computer readable medium may comprise computer storage media and communication media. Computer storage media includes volatile and nonvolatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other medium which can be used to store the desired information and which can be accessed by a computing device. Communication media typically embodies carrier waves or other transport mechanism and includes any information delivery media. By way of example, and not limitation, communication media includes wired media such as a wired network or direct-wired connection, and wireless media such as acoustic, RF, infrared, other wireless media, and combinations of any of the above.

Some embodiments may be described in the general context of computer-executable instructions, such as program modules, executed by one or more computers or other devices. Generally, program modules include routines, programs, objects, components, data structures, etc, that perform particular tasks or implement particular abstract data types. The functionality of the program modules may be combined or distributed as desired in various embodiments.

The foregoing descriptions of specific embodiments have been presented for purposes of illustration and description. They are not intended to be exhaustive or to limit the invention to the precise forms disclosed, and many modifications and variations are possible in light of the above teaching. The embodiments were chosen and described in order to best explain the principles and its practical application, to thereby enable others skilled in the art to best utilize the invention and various embodiments with various modifications as are suited to the particular use contemplated. It is intended that the scope be defined by the Claims appended hereto and their equivalents.

What is claimed is:

1. A backup restore test method comprising:
   performing a backup process;
   performing a test restore virtual environment creation process including:
      gathering information identifying prerequisites associated with the application;
      creating a plurality of virtual machines included in the test restore virtual environment, wherein the plurality of virtual machines includes virtual machines corresponding to physical machines that the application and perquisites run on;
      bringing up the plurality of virtual machines utilizing the information from the backup process; and
   performing a test of a backup on the test restore virtual environment.

2. The backup restore test method of claim 1 wherein the backup process includes:
   backing up information associated with an application;
   identifying prerequisites associated with running the application; and
   backing up information associated with the prerequisites.

3. The backup restore test method of claim 1 wherein bringing up the plurality of virtual machines includes coordinating availability of the plurality of the virtual machines and services there on.

4. The memory restore test method of claim 1 wherein the backup process includes collecting application specific configuration information.

5. The backup restore test method of claim 4 further comprising using the application specific configuration information to link backups of different machines associated with the prerequisites.

6. The backup restore test method of claim 1 wherein the test restore virtual environment creation process includes identifying machines associated with running application specific tests.

7. A computer readable storage medium having stored thereon, computer-executable instructions that when executed by a computing device cause the computing device to perform a backup restore test method comprising:
   performing a backup process;
   performing a test restore virtual environment creation process including:
      gathering information identifying prerequisites associated with the application;
      creating a plurality of virtual machines included in the test restore virtual environment, wherein the plurality of virtual machines includes virtual machines corresponding to physical machines that the application and perquisites run on;
      bringing up the plurality of virtual machines utilizing the information from the backup process; and
      performing a test of a backup on the test restore virtual environment.

8. A computer readable storage medium of claim 7 wherein the backup process includes:
   backing up information associated with an application;
   identifying prerequisites associated with running the application; and
   backing up information associated with the prerequisites.

9. A computer readable storage medium of claim 8 wherein bringing up the plurality of virtual machines includes coordinating availability of the plurality of the virtual machines and services there on.

10. A computer readable storage medium of claim 7 wherein the backup process includes collecting application specific configuration information.

11. A computer readable storage medium of claim 10 further comprising using the application specific configuration information to link backups of different machines associated with the prerequisites.

12. A computer readable storage medium of claim 7 wherein the test restore virtual environment creation process includes identifying machines associated with running application specific tests.

13. A system, comprising:
   a computer system having a processor coupled to a computer readable storage media and executing computer readable code which causes the computer system to perform a backup test restore method comprising:
   performing a backup process;
   performing a test restore virtual environment creation process including:
      gathering information identifying prerequisites associated with the application;
      creating a plurality of virtual machines included in the test restore virtual environment, wherein the plurality of virtual machines includes virtual machines corresponding to physical machines that the application and perquisites run on;
      bringing up the plurality of virtual machines utilizing the information from the backup process; and performing a test of a backup on the test restore virtual environment.

14. The system of claim 13 wherein the backup process includes:
  backing up information associated with an application;
  identifying prerequisites associated with running the application; and
  backing up information associated with the prerequisites.

15. The system of claim 13 wherein bringing up the plurality of virtual machines includes coordinating availability of the plurality of virtual machines and services there on.

16. The system of claim 13 wherein the backup process includes collecting application specific configuration information.

17. The system of claim 16 further comprising using the application specific configuration information to link backups of different machines associated with the prerequisites.

* * * * *